March 12, 1940.  A. N. PORTER  2,193,379
ROCKING BEARING FOR PUMPING UNITS AND THE LIKE
Filed Aug. 16, 1937  4 Sheets-Sheet 3
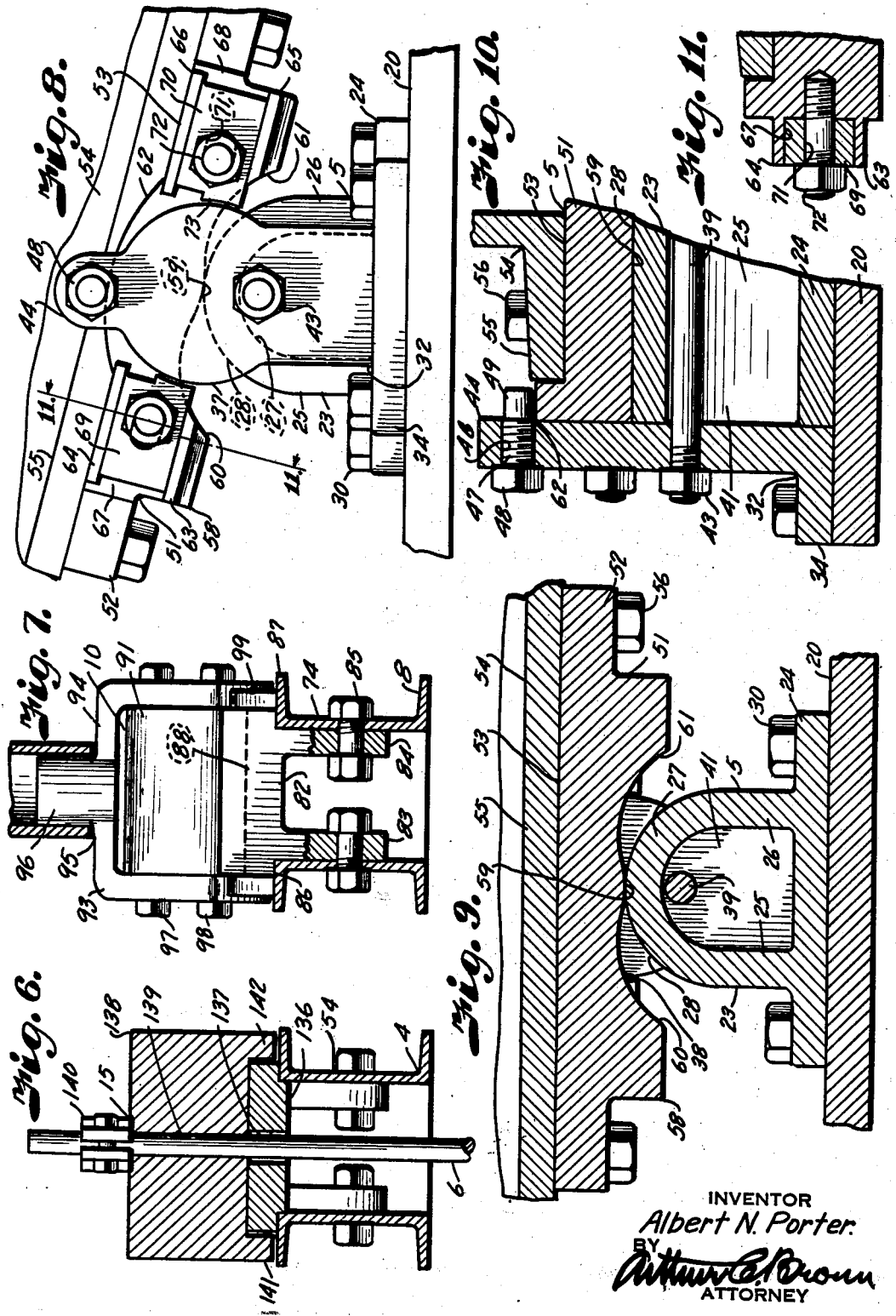

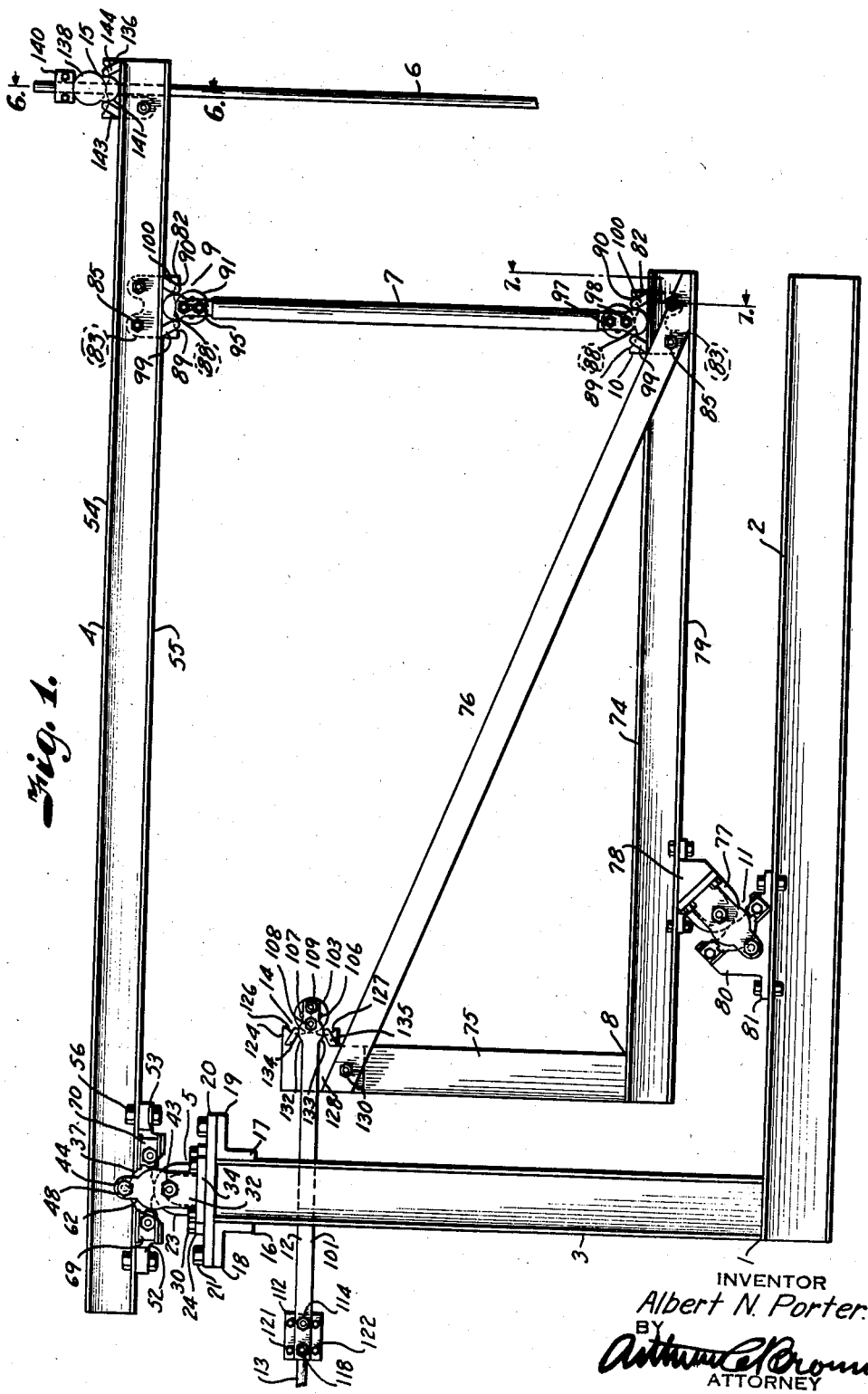

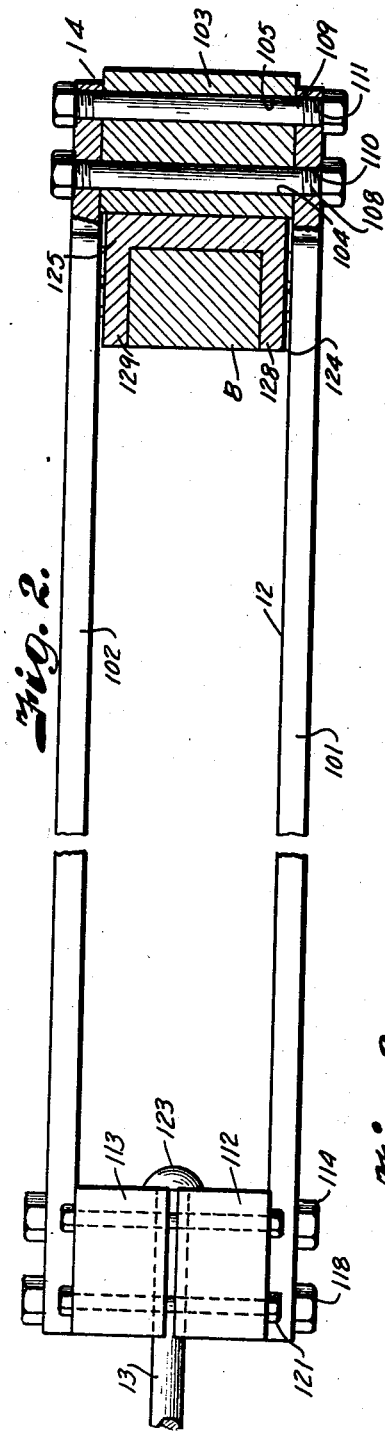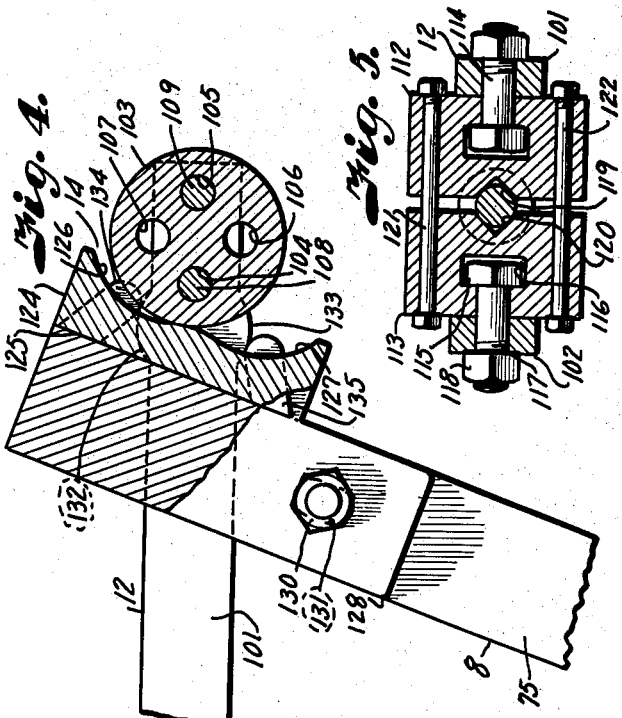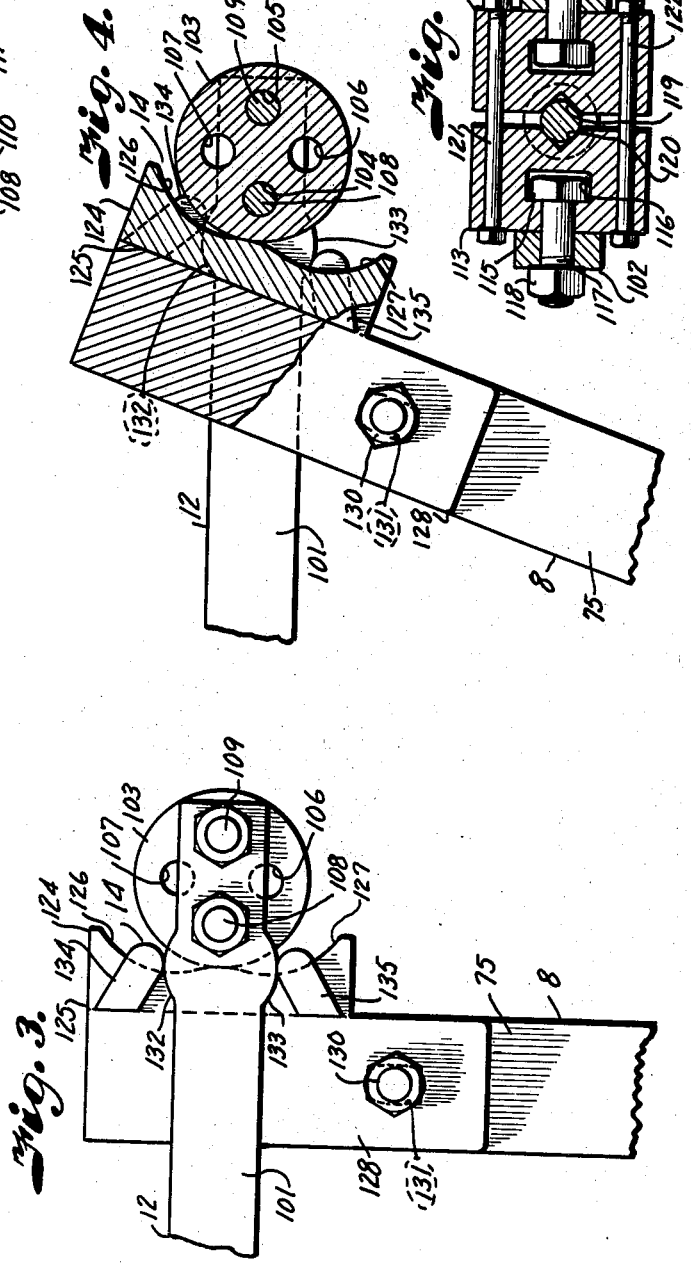

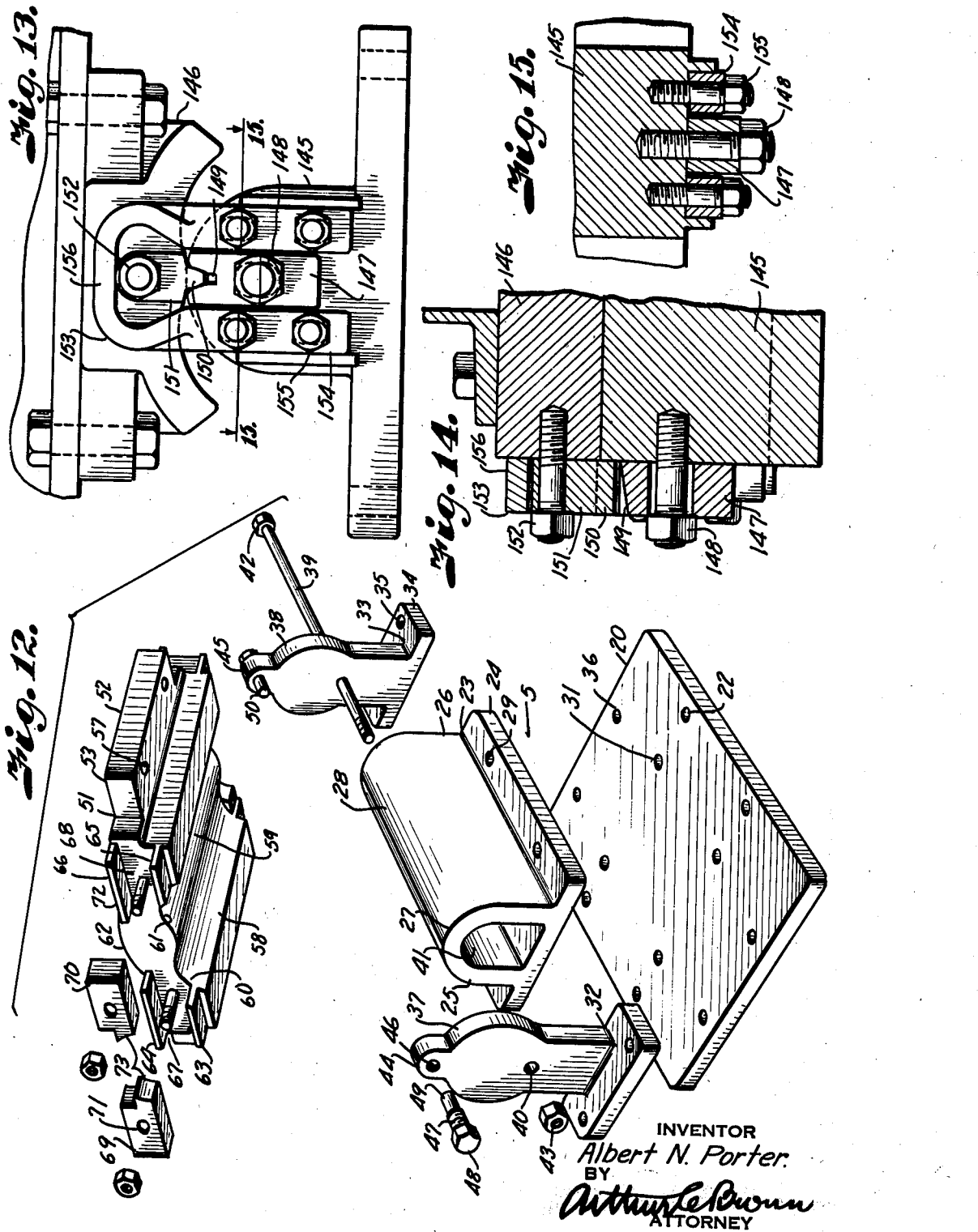

Patented Mar. 12, 1940

2,193,379

UNITED STATES PATENT OFFICE 2,193,379

ROCKING BEARING FOR PUMPING UNITS AND THE LIKE

Albert N. Porter, Tulsa, Okla., assignor to J. F. Darby, Tulsa, Okla.

Application August 16, 1937, Serial No. 159,277

16 Claims. (Cl. 308—21)

This invention relates to rocker bearings for pumping units such as used for lifting fluid from deep wells, and has for its principal object to provide a bearing of this character wherein the oscillating bearing surfaces have rolling or rocking contact relative to each other to reduce friction and to obviate the necessity of lubrication.

Other important objects of the invention are to provide oscillating bearings capable of withstanding the loads and thrusts to which such bearings are subjected; and to provide a bearing with reversible parts to present new contact surfaces.

In accomplishing these and other objects of the invention, as hereinafter pointed out, I have provided improved details of structure, the preferred forms of which are illustrated in the accompanying drawings, wherein:

Fig. 1 is a side elevational view of a pumping jack equipped with bearings embodying the features of the present invention.

Fig. 2 is a detail view, partly in section, of the pull rod stirrup and the upper portion of the beam rocking member and their associated bearing connection.

Fig. 3 is an enlarged side elevational view of the stirrup and beam rocking member, illustrating the bearing connection therebetween.

Fig. 4 is a similar view, partly in section, showing another position of the parts illustrated in Fig. 3, and particularly illustrating the relative rolling or rocking contact between the bearing members.

Fig. 5 is a detail sectional view through the clamp end of the stirrup as attached to a pull rod for actuating the pumping jack.

Fig. 6 is an enlarged section through the front end of the beam, illustrating the bearing connection of the polish rod with the beam, the section being taken on the line 6—6 of Fig. 1.

Fig. 7 is a detail sectional view through the forward end of the beam rocking member, illustrating the link connection therewith, the section being taken on the line 7—7 of Fig. 1.

Fig. 8 is an enlarged detail view of the main bearing or saddle for mounting the walking beam.

Fig. 9 is a longitudinal section through the main bearing or saddle.

Fig. 10 is a fragmentary transverse section through one side of the main bearing.

Fig. 11 is a section on the line 11—11 of Fig. 8.

Fig. 12 is a detail perspective view of the parts of the main bearing, shown in disassembled spaced relation to better illustrate their construction.

Fig. 13 is a side elevational view of a modified form of main bearing or saddle.

Fig. 14 is a detail section through one side of the main bearing illustrated in Fig. 13.

Fig. 15 is a cross-section taken on the line 15—15 of Fig. 13.

Referring more in detail to the drawings:

1 designates a pumping jack equipped with bearings constructed in accordance with the present invention. The pumping jack includes a base 2, carrying an upright support 3 at one end thereof to pivotally mount one end of a walking beam 4 on a main bearing 5 that is constructed in accordance with the present invention, as later described. The opposite end of the walking beam projects beyond the forward end of the base 2 and is supported against the weight of the rods 6 by a link 7, having connection with the beam and the forward end of a beam rocking member 8 by means of bearings 9 and 10 respectively, also constructed in accordance with the present invention.

The beam rocking member 8 is pivotally mounted on the base 2 by a bearing 11, and is oscillated by a stirrup 12 having connection with a pull rod 13, the stirrup and rocking member also being provided with a bearing connection 14 constructed in accordance with the present invention. The rods 6 are connected with the forward end of the beam by a similar bearing connection 15. Mounted on the upper end of the post 3 are angles 16 and 17, having lateral flanges 18 and 19 arranged in the plane of the upper end of the post to attach a cap plate 20 by fastening devices 21, extending through suitable openings 22 in the plate and into the flanges of the angles, as shown in Fig. 1, to provide mounting for the bearing 5 now to be described.

The bearing 5 includes a fixed fulcrum member 23 comprising a base flange 24, having upwardly extending spaced webs or legs 25 and 26 connected by a substantially semicylindrical web portion 27 to form a rounded, external bearing surface 28. The base plate 24 is of sufficient width to accommodate openings 29 at the outer sides of the webs to pass fastening devices, such as bolts, 30 through aligning openings 31 in the cap plate.

Mounted at each end of the fixed fulcrum member are end plates 32 and 33, having foot flanges 34 seated on the cap plate and retained in fixed relation therewith by bolts extending through openings 35 in the foot flanges and through aligning openings 36 in the cap plate. The upper end of the end plates have arcuate shaped guide wings 37 and 38 with their axis aligning with the median point of the bearing surface 28, as clearly shown in Fig. 8. The plates 32 and 33 are further clamped against the ends of the fixed fulcrum member by means of a draw bolt 39, having its shank extending through openings 40 in the plates and through the space 41 provided between the webs 25 and 26, the head 42 of the draw bolt engaging against the plate 33 and the nut 43 engaging against the outer face of the plate 32. Formed integrally with the plates, and extending upwardly from the vertical median lines thereof, are ears 44 and 45, having threaded openings 46 for mounting the threaded shanks 47 of the cap screws 48. The cap screws have reduced cylindrical ends 49 and 50, projecting beyond the inner faces of the ears to guidingly engage the movable rocking member 51 of the bearing.

The rocking member 51 includes an attaching plate 52, having a flat seat 53 on its upper face to mount the walking beam 4. In the illustrated instance, the walking beam comprises a pair of parallel, spaced channel members 54, arranged with the webs thereof in face to face relation with the lower flanges 55 extending outwardly and engaging the seat 53. The channels are secured to the seat by fastening devices, such as bolts, 56 extending through the flanges and through aligning openings 57 in the plate portion of the rocking member of the bearing. Formed integrally with the bottom side of the plate, and of sufficient width to rock freely between the end plates 32 and 33, is a pad portion 58 having the central portion, or the part contacting the fixed fulcrum, recessed to provide a central, transversely extending arcuate portion 59 corresponding in radius with the radius of the surface 28, but arranged reversely thereto to provide line contact therewith.

Arranged reversely, and on opposite sides of the bearing portion 59, are concave, arcuate bearing portions 60 and 61, conforming in curvature to the curvature of the fixed fulcrum surface 28 and merging into the curvature of the arcuate bearing surface 59, so that the bearing surface 59 of the rocking member may rock freely from the cylindrical bearing surface of the fixed fulcrum member, substantially in the same manner as the rolling contact of a wheel. In other words, when the rocking bearing member is oscillated incidental to oscillatory movement of the beam, the bearing surfaces have relative rolling contact to each other as distinguished from sliding contact of ordinary plain bearings. In order to retain the rocking bearing member for oscillatory movement on the fixed fulcrum member, the cylindrical ends 49 and 50 of the screws 48 engage over arcuate shaped ribs 62 formed on the sides of the plate portion of the rocking bearing as shown in Fig. 10, the curvature of the guide ribs corresponding to the arcuate movement of the beam so that while the guides 49 and 50 will remain slightly out of contact with the guide ribs, they will closely follow the curvature thereof to prevent upward movement of the rocking member caused by thrusts imparted incidental to the changing directional movement of the beam when actuated by the rocking member 8 through the link connection 7.

Projecting laterally from opposite sides of the rocking member of the bearing are pairs of spaced flanges 63—64 and 65—66 to form recesses 67 and 68 therebetween for retaining stop members 69 and 70. The stop members 69 and 70 comprise plates snugly engaged between the flanges and provided with slotted openings 71, through which fastening devices, such as studs, 72 are extended to adjustably clamp the plates in the recesses, so that lugs or fingers 73 on the plates are retained in slightly spaced relation with the arcuate guide faces 37 and 38 on the end plates of the fixed bearing member. Thus when the beam is rocked the guide portions of the plates will closely follow the curvature of the end plates to control rocking movement of the rocking bearing member relative to the fixed fulcrum member, and thereby prevent longitudinal shifting of the beam when actuated under the load of the rod 6.

With the bearing constructed as described, it is clearly obvious that the movable bearing member has rocking line contact on the arcuate surface of the fixed fulcrum member so that there is in effect a rolling contact between the respective surfaces, thereby alleviating frictional contact between the members that ordinarily absorbs power and which requires the use of a lubricant.

The rocking member 8 is of substantially triangular shape, and includes base channels 74 extending longitudinally of the base 2, and an arm 75 fixed to the rear ends of the base channels and having its upper end braced to the forward end of the base channels by bars 76. The rocking member is mounted for oscillatory movement on the base 2 by means of the bearing 11, which is constructed identically to the bearing 5, with the exception that the parts of the bearing are reversely arranged with the bearing 77 having the semicylindrical contact surface fixed to a block 78 that is bolted to the lower flanges 79 of the base channels 74, and the supporting bearing member corresponding to the rocking member in the bearing 5 is fixed to the base 2, the bearing plate being secured to an angle shaped bracket 80, bolted to the upper flanges of the base as indicated at 81. The bearing surfaces are thus arranged in angular relation relatively to a horizontal plane so that the thrust imparted by the pull rod 13 acts to retain the semicylindrical bearing surface in rolling line contact with the complementary bearing surface of the other member.

The bearings 9 and 10, connecting the link 7 with the rocking member and walking beam, are best illustrated in Fig. 7, and are each of identically the same construction except for their reversed arrangement. These bearings include a block 82, having ears 83 and 84 engaging between the respective channels and which are secured thereto by fastening devices, such as bolts 85, extending through the ears and through aligning openings in the webs of the channels. The sides of the blocks preferably project slightly over the flanges to provide thrust shoulders 86 and 87. The outer face of the block includes a central, convex, arcuate bearing surface 88, terminating at the sides in concave, arcuate surfaces 89 and 90, and having relative rolling contact with substantially cylindrical bearing members 91 that are carried by the ends of the link. The members 91 correspond in length to the width of the block 82 and are carried between the arms 93 and 94 of a yoke 95, having a shank 96 engaging in cylindrical sockets formed in the respective ends of the connecting link. The cylindrical members 91 are secured to the arms of the yoke by bolts 97 and 98, extending through openings in the arms and through one of a pair of aligning openings in the cylindrical member. The other pair of openings in the cylindrical member corresponds in spaced relation to the first and is offset 90° therefrom so that when one contacting surface becomes worn the bolts may be removed and the members located to bring the other pair of openings in alignment with the bolt holes in the arms of the yokes, whereupon the bolts are reinserted to retain a new wearing surface in contact with the bearing surface of the other bearing member.

The ends of the arms terminate in cylindrical, disk-shaped portions forming arcuate guide wings that are adapted to be engaged by converging fingers 99 and 100 which correspond to the plates 69 and 70 of the previously described bearings. In this form of the invention no retaining means is necessary to keep the bearing surfaces in contact since this is effected by the weight of the rods 6, supplemental by the weight of the fluid being lifted.

The pull rod stirrup 12 includes spaced bars 101 and 102, carrying a cylindrical bearing member 103 between their forward ends and similar to the cylindrical bearing members 91, previously described. The bearing member 103 is also positioned between the bars 101 and 102 by providing pairs of openings 104—105 and 106—107 extending therethrough, through which fastening devices, such as bolts, 108 and 109 are selectively projected and through aligning openings 110 and 111 in the ends of the arms, the bolts being provided with threaded ends and nuts to clamp the bars tightly against the ends of the cylindrical member. The opposite ends of the bars carry clamping blocks 112 and 113 secured to the respective bars by bolts 114, having their heads 115 engaged within sockets 116 of the blocks, and their shanks 117 through aligning openings in the ends of the bars, the bars being drawn into clamping contact with the blocks by nuts 118 threaded on the shanks of the bolts. The adjacent faces of the blocks are provided with substantially V-shaped jaws 119 and 120 for engaging the opposite sides of the pull rod 13. The jaws are drawn into clamping engagement with the rod by draw bolts 121 and 122 extending through suitable openings in the respective blocks on opposite sides of the pull rod, as clearly shown in Fig. 5. To further anchor the stirrup to the pull rod, the pull rod is provided with a head 123 for engaging the inner ends of the blocks, as shown in Fig. 2.

The complementary bearing member 124 for the member 103 includes a plate portion 125, having a central, arcuate surface, in the same manner as the bearings previously described. The plate portion 125 has laterally extending wings 128 and 129 that straddle the upright arm of the rocking member and which are secured thereto by a bolt 130 that also attaches the rear end of the braces 76. The member 124 is adjustable relatively to the upright arm by providing slotted openings 131 in the wings, as shown in Fig. 4.

In order to retain the cylindrical member 103 in line bearing contact with the central, arcuate portion of the complementary bearing member, the bars 101 and 102 have arcuate wings 132 and 133 on opposite sides thereof that are adapted to be engaged by the terminal ends of fingers 134 and 135 provided on opposite sides of the plate 125, as shown in Fig. 3.

The forward end of the beam 4 is provided with a bearing block 136, similar to the block 82, with the exception that the block is provided with a slot 137 (Fig. 6), to accommodate the upper end of the polish rod. The complementary bearing member 138 includes a cylindrical body, similar to the corresponding member of the other bearings, and is provided with a central opening 139 aligning with the slot 137 to pass the polish rod. The polish rod is retained by a clamp 140 engaging the upper end of the rod and seating upon the member 138. The ends of the bearing member 138 have depending, arcuate flanges 141 and 142, extending over the sides of the block 136, and which are adapted to be engaged by the converging fingers 143 and 144, similar to the fingers of the other bearing blocks, to retain the bearing members in relative rolling contact during swinging movement of the beam.

In operating a pumping jack constructed and assembled as described, the pull rod 13 is connected with a suitable power as in conventional practice. Reciprocation of the pull rod rocks the member 8 on the bearing 11 to effect swinging movement of the beam through the link connection 7. Due to the angular relation of the contact surfaces for the bearing member 11, the bearing member having the substantially semispherical contact surface is retained in rolling contact with its complementary bearing member. The end plates 32 and 33, overlapping the sides of the fixed bearing member, retain the rocking member for oscillatory movement in a fixed plane, and the pins 49 and 50 engaging the arcuate guide tracks prevent relative displacement of the bearing surfaces incidental to any irregular action produced by the power unit or pump rods.

During swinging movement of the beam, the central, arcuate portion of the bearing 5 rocks on the semicylindrical surface of the fixed bearing member, and the surfaces are kept in contact in the same manner as described in connection with the bearing 11. The other pivot connections, including the stirrup bearing 14, the link bearings 9 and 10, and the bearing 15, are all actuated with the cylindrical surfaces of the movable bearing member having relative rocking contact on the central, convex portion of the complementary bearing members, the supporting members for the cylindrical bearing elements being retained by the fingers so that they always retain their proper alignment.

Figs. 13, 14 and 15 show a modified form of bearing wherein the complementary bearing members 145 and 146 substantially conform to the corresponding parts of the main bearing members previously described, however, the cylindrical portion of the bearing member 145 is provided with plates 147 that are secured to the ends thereof by clamping studs 148, the plates being provided with tooth shaped recesses 149, adapted to be engaged by teeth 150 projecting from plates 151 that are attached to the sides of the bearing member 146 by clamping studs 152. The teeth 150 engaging the toothed recess 149 retain the movable bearing member in oscillatory relation to the complementary bearing member so that the bearing surfaces are kept in line contact.

In order to prevent movement of one of the bearing members away from the other, the bearing member 145 carries inverted stirrups 153, having strap portions 154 secured to the sides of the semicylindrical portion by clamping studs 155. The stirrup portions 156 extend over the rounded upper ends of the plates 151, as clearly shown in Figs. 13 and 14, so that in case the bearing member 146 tends to move away from its complementary bearing 145, the rounded ends of the plate engage the stirrup. Otherwise the action of the modified form of bearing is the same as that in the other forms previously described.

While I have specifically defined my invention as applied to pumping units or rigs, it is obvious that it may be used in other forms of equipment without departing from the spirit of the invention.

From the foregoing it is obvious that I have provided a pumping unit which is equipped with bearings wherein the contact surfaces have relative rolling, rocking action to reduce friction and eliminate the necessity of lubrication.

What I claim and desire to secure by Letters Patent is:

1. A bearing including a bearing member having a convex arcuate bearing surface, a complementary bearing member having a similar convex but reversely arranged arcuate bearing surface to rock on the bearing surface of the first named member, end members engaged with the ends of the first named bearing member and having arcuate wing portions engaging the sides of said rockable bearing member, guide means on the rockable bearing member adapted to engage said wing portions to control rocking movement of the rocking member, and means for retainingly engaging said rockable bearing member to keep said surfaces in bearing contact.

2. A bearing including a bearing member having a concex arcuate bearing surface with its axis of curvature extending parallel with the axis of the bearing, a complementary bearing member having a similar convex but reversely arranged arcuate bearing surface to rock on the bearing surface of the first named member, end plates engaged with the ends of the first named bearing member and having arcuate wing portions engaging the sides of said rockable bearing member, guide means on the rockable bearing member adapted to engage said wing portions to control rocking movement of the rocking member, arcuate guide portions on the rockable bearing member, and guide engaging means projecting from the end plates for engaging said arcuate guide portions.

3. A bearing including a bearing member having a convex arcuate bearing surface with its axis of curvature extending parallel with the axis of the bearing, a complementary bearing member having a similar convex bearing surface arranged reversely to and in line contact with the surface of the other bearing member, and means for controlling rocking movement of one of the bearing members relative to the other including guide fingers on one of the members and arcuate guide means engageable by said fingers and fixed relative to the other member.

4. A bearing including a bearing member having a convex arcuate bearing surface with its axis of curvature extending parallel with the axis of the bearing, a complementary bearing member having a similar convex but reversely arranged arcuate bearing surface to rock on the convex bearing surface of the first named member, means for retaining said surfaces in bearing contact, and means for controlling rocking movement of the rockable bearing member including guide fingers on one of the members and arcuate guide means engaged by said fingers and fixed relatively to the other member.

5. In combination with a support and a rocking member, a bearing mounting the rocking member on the support including a bearing member on the rocking member having a convex arcuate bearing surface with its axis of curvature extending parallel with the axis of the bearing, a complementary bearing member on the support having a similar convex bearing surface in line contact with said convex surface of the other bearing member and having concave arcuate surfaces on opposite sides to accommodate movement of the bearing members on the rocking member, arcuate guides on one of said members, and means on the other member for engaging said arcuate guides to retain said members in bearing contact.

6. In combination with a rocking member, a pull rod stirrup and a bearing connecting the pull rod stirrup with the rocking member including, a bearing member having a convex arcuate bearing surface with its axis extending parallel with the axis of the bearing, means mounting said bearing member on the rocking member, a cylindrical bearing member carried by the pull rod stirrup and having rocking contact on said convex bearing surface of the other bearing member, and interengaging means on said bearing members to maintain said rocking contact.

7. In combination with a pair of movable members, a bearing connecting said members including, a bearing member having a convex arcuate bearing surface with its axis extending parallel with the axis of the bearing and concaved arcuate bearing portions on opposite sides thereof, means mounting said bearing member on one of said movable members, and a cylindrical bearing member carried by the other movable member and having rocking contact with the convex bearing surface of the other bearing member.

8. In combination with a rocking member, a pull rod stirrup and a bearing connecting the pull rod stirrup with the rocking member including, a bearing member having a convex arcuate bearing surface with its axis extending parallel with the axis of the bearing, means mounting said bearing member on the rocking member, a cylindrical bearing member carried by the stirrup and having rocking contact with the convex bearing surface of the other member, arcuate guide wings on said stirrup, and guide means on the first named bearing member for engaging said guide wings to retain said bearing members in relative rocking contact with each other.

9. In combination with a rocking member, a pull rod stirrup and a bearing connecting the pull rod stirrup with the rocking member including, a bearing member having a convex arcuate bearing surface with its axis extending parallel with the axis of the bearing, means mounting said bearing member on the rocking member, a cylindrical bearing member carried by the stirrup and having rocking engagement with the convex bearing surface of the other member, and means supporting the cylindrical bearing member for selectively changing its contact surface with the first named bearing member.

10. A bearing including a bearing member having a convex arcuate bearing surface extending completely across the width thereof, a complementary bearing member having a similar convex bearing surface in line contact with said convex arcuate surface of the other bearing member whereby one of said members is adapted to rock on the other, arcuate guide means fixed relatively to one of said bearing members and having a common axis coincident with said line contact at one position of said rocking member, and means on the rocking member movable over said arcuate guide means for retaining the bearing members with their bearing surfaces in line contact during said rocking movement.

11. A bearing including a bearing member having a convex arcuate bearing surface extending completely across the width thereof, a complementary bearing member having a similar convex bearing surface in line contact with said convex arcuate surface of the other bearing member whereby one of said members is adapted to rock on the other, arcuate wings extending on opposite sides of the median point of movement of one member on the other, and guide members carried by the movable member and adapted to engage said arcuate wings during movement of one of the bearing members on the other.

12. A bearing including a bearing member having a convex arcuate bearing surface with its axis of curvature extending parallel with the axis of the bearing, a complementary bearing member having a similar convex bearing surface in line contact with said surface of the other bearing member and having concave arcuate surfaces on opposite sides of said convex bearing surface to accommodate rocking movement of one of said bearing members relatively to the other, arcuate wings extending on opposite sides of the median point of movement of one member on the other, and guide members carried by the movable member and engageable with said arcuate wings during rocking movement of one of the bearing members on the other.

13. A bearing including a bearing member having a convex arcuate bearing surface with its axis of curvature extending parallel with the axis of the bearing, a complementary bearing member having a similar convex bearing surface in line contact with said surface of the other bearing member and having concave arcuate surfaces on opposite sides of said convex bearing surface to accommodate rocking movement of one of said bearing members relatively to the other, arcuate guide means fixed with respect to one of the bearing members and having a common axis coincident with said line contact at one position of said rocking member, and means on the other bearing member movable over said arcuate guide means for retaining the bearing members with their bearing surfaces in line contact during rocking movement of one of said members relative to the other.

14. A bearing including a bearing member having a convex arcuate bearing surface, a complementary bearing member having a similar convex bearing surface in line contact with said convex arcuate surface of the other bearing member whereby one of said members is adapted to rock on the other, arcuate guide means fixed relatively to one of said bearing members and having an axis coincident with said line contact at one position of said rocking member, retaining means on the rocking member movable over said arcuate guide means, an arcuate guide on the rocking member, and retaining means engaging the last named arcuate guide and cooperating with the first named retaining means for retaining the bearing members with their bearing surfaces in line contact during rocking movement.

15. A bearing including a bearing member having a convex arcuate bearing surface with its axis of curvature extending parallel with the axis of the bearing, a complementary bearing member having a similar convex bearing surface in line contact with said surface of the other bearing member and having concave arcuate surfaces on opposite sides of said convex bearing surface to accommodate rocking movement of one of said bearing members relatively to the other, arcuate guides fixed with respect to one of the bearing members and having a common axis coincident with said line contact at one position of said rocking member, retaining means on the other bearing member movable over said arcuate guides, an arcuate guide on the rocking member, and retaining means fixed with respect to the rocking member and engageable with said last named arcuate guide.

16. A bearing including a bearing member having a convex partially cylindrical bearing surface, a complementary bearing member having a similar convex partially cylindrical bearing surface arranged reversely and in line contact with the bearing surface of the other member whereby one of said members is adapted to rock relatively on the other, and interengaging means on the respective members and arranged to resist lifting thrusts tending to lift one of said members from rocking contact with the other.

ALBERT N. PORTER.